(12) United States Patent
Unten et al.

(10) Patent No.: US 10,347,029 B2
(45) Date of Patent: Jul. 9, 2019

(54) APPARATUS FOR MEASURING THREE DIMENSIONAL SHAPE, METHOD FOR MEASURING THREE DIMENSIONAL SHAPE AND THREE DIMENSIONAL SHAPE MEASUREMENT PROGRAM

(71) Applicant: TOPPAN PRINTING CO., LTD., Taito-ku (JP)

(72) Inventors: Hiroki Unten, Taito-ku (JP); Tatsuya Ishii, Taito-ku (JP)

(73) Assignee: TOPPAN PRINTING CO., LTD., Taito-ku (JP)

(*) Notice: Subject to any disclaimer, the term of this patent is extended or adjusted under 35 U.S.C. 154(b) by 5 days.

(21) Appl. No.: 15/148,180

(22) Filed: May 6, 2016

(65) Prior Publication Data

US 2016/0253836 A1 Sep. 1, 2016

Related U.S. Application Data

(63) Continuation of application No. PCT/JP2014/074424, filed on Sep. 16, 2014.

(30) Foreign Application Priority Data

Nov. 6, 2013 (JP) .................................. 2013-230321

(51) Int. Cl.
*G06T 15/00* (2011.01)
*G06T 17/00* (2006.01)
*G06T 7/55* (2017.01)

(52) U.S. Cl.
CPC ................ *G06T 15/00* (2013.01); *G06T 7/55* (2017.01); *G06T 17/00* (2013.01);
(Continued)

(58) Field of Classification Search
CPC .......... G06T 17/20; G06T 17/00; G06T 15/00
See application file for complete search history.

(56) References Cited

U.S. PATENT DOCUMENTS 8,259,161 B1 * 9/2012 Huang ............... H04N 13/0221
 348/50
2002/0181663 A1 * 12/2002 Paladini .................. G06T 15/20
 378/210
(Continued)

FOREIGN PATENT DOCUMENTS

JP 2000-180137 A 6/2000
JP 2001-145128 A 5/2001
(Continued)

OTHER PUBLICATIONS

Extended European Search Report dated Jun. 7, 2017 in Patent Application No. 14860750.0.
(Continued)

*Primary Examiner* — Yi Yang
(74) *Attorney, Agent, or Firm* — Oblon, McClelland, Maier & Neustadt, L.L.P.

(57) ABSTRACT

A three-dimensional shape measurement apparatus includes an imaging unit that successively outputs two-dimensional images captured, a memory unit that stores the two-dimensional images outputted by the imaging unit, a three-dimensional shape model generation unit which generates a three-dimensional shape model, based on the two-dimensional images and stores the three-dimensional shape model in the memory unit, a region calculation unit that calculates, based on the two-dimensional images and the three-dimensional shape model stored in the memory unit, a measurement-completed region in the two-dimensional images, and a display image generation unit that generates, based on the measurement-completed region, a display image from the two-dimensional images.

17 Claims, 4 Drawing Sheets

(52) U.S. Cl.
CPC .............. *G06T 2200/24* (2013.01); *G06T 2207/10028* (2013.01); *G06T 2207/30244* (2013.01)

(56) References Cited

U.S. PATENT DOCUMENTS

| | | | |
|---|---|---|---|
| 2006/0239539 A1 | 10/2006 | Kochi et al. | |
| 2006/0290695 A1* | 12/2006 | Salomie | G06T 17/20 345/420 |
| 2009/0244277 A1* | 10/2009 | Nagashima | G01C 1/04 348/135 |
| 2011/0158504 A1* | 6/2011 | Turner | H04N 13/026 382/154 |
| 2012/0163659 A1 | 6/2012 | Asakura et al. | |
| 2013/0249901 A1* | 9/2013 | Sweet | G06T 17/00 345/419 |

FOREIGN PATENT DOCUMENTS

| | | |
|---|---|---|
| JP | 2002-027500 A | 1/2002 |
| JP | 2006-3280 | 1/2006 |
| JP | 2006-267031 A | 10/2006 |
| JP | 2009-511897 A | 3/2009 |
| JP | 2009-530604 A | 8/2009 |
| JP | 2010-152535 A | 7/2010 |
| JP | 2010-219825 A | 9/2010 |
| JP | 2011-527790 A | 11/2011 |
| JP | 2012-142779 A | 7/2012 |
| JP | 2013-186042 A | 9/2013 |

OTHER PUBLICATIONS

Hao Du, et al., "Interactive 3D Modeling of Indoor Environments with a Consumer Depth Camera" Proceedings of the 13$^{th}$ International Conference on Ubiquitous Computing, XP055163061, Sep. 17, 2011, pp. 75-84.

Michael Krainin, et al., "Autonomous Generation of Complete 3D Object Models Using Next Best View Manipulation Planning" IEEE International Conference on Robotics and Automation, XP032034249, May 9, 2011, pp. 5031-5037.

International Search Report dated Nov. 4, 2014 in PCT/JP2014/074424, filed Sep. 16, 2014.

Hiroki Unten et. al., "A Practical VR-Model Generation Method by Utilizing Moving-shots with Stereo Camera—Stereo Moving-shot Modeling System (SM2S)—", The Virtual Reality Society of Japan, Journal vol. 12, No. 2, 2007, 9 pages.

Shahram Izadi et. al., "KinectFusion: Real-time 3D Reconstruction and Interaction Using a Moving Depth Camera", ACM Symposium on User Interface Software & Technology, Oct. 2011, 10 pages.

Office Action dated Jul. 3, 2018, in Japanese Patent Application No. 2015-546327 (with English-language-translation,), 7 pgs.

* cited by examiner

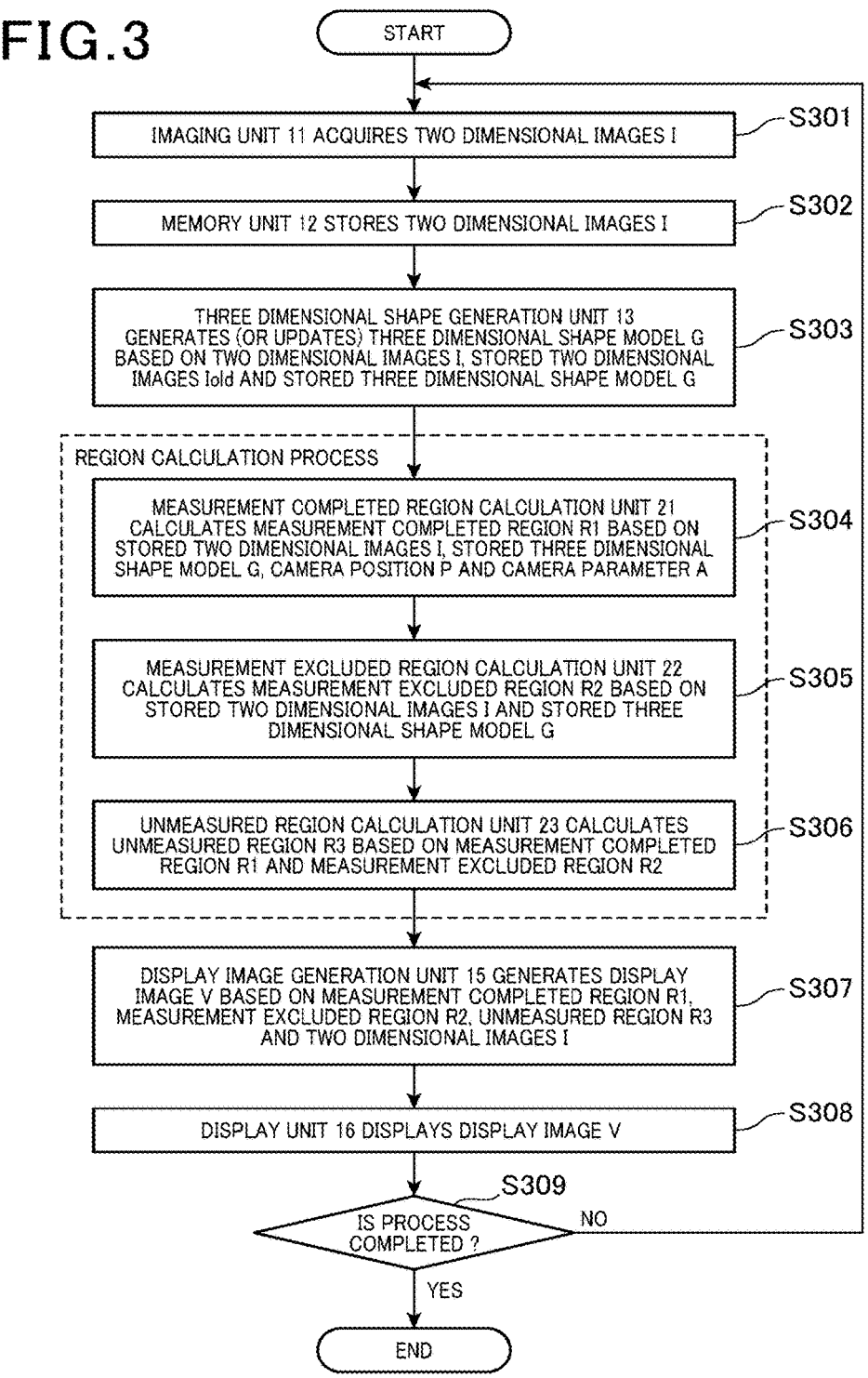

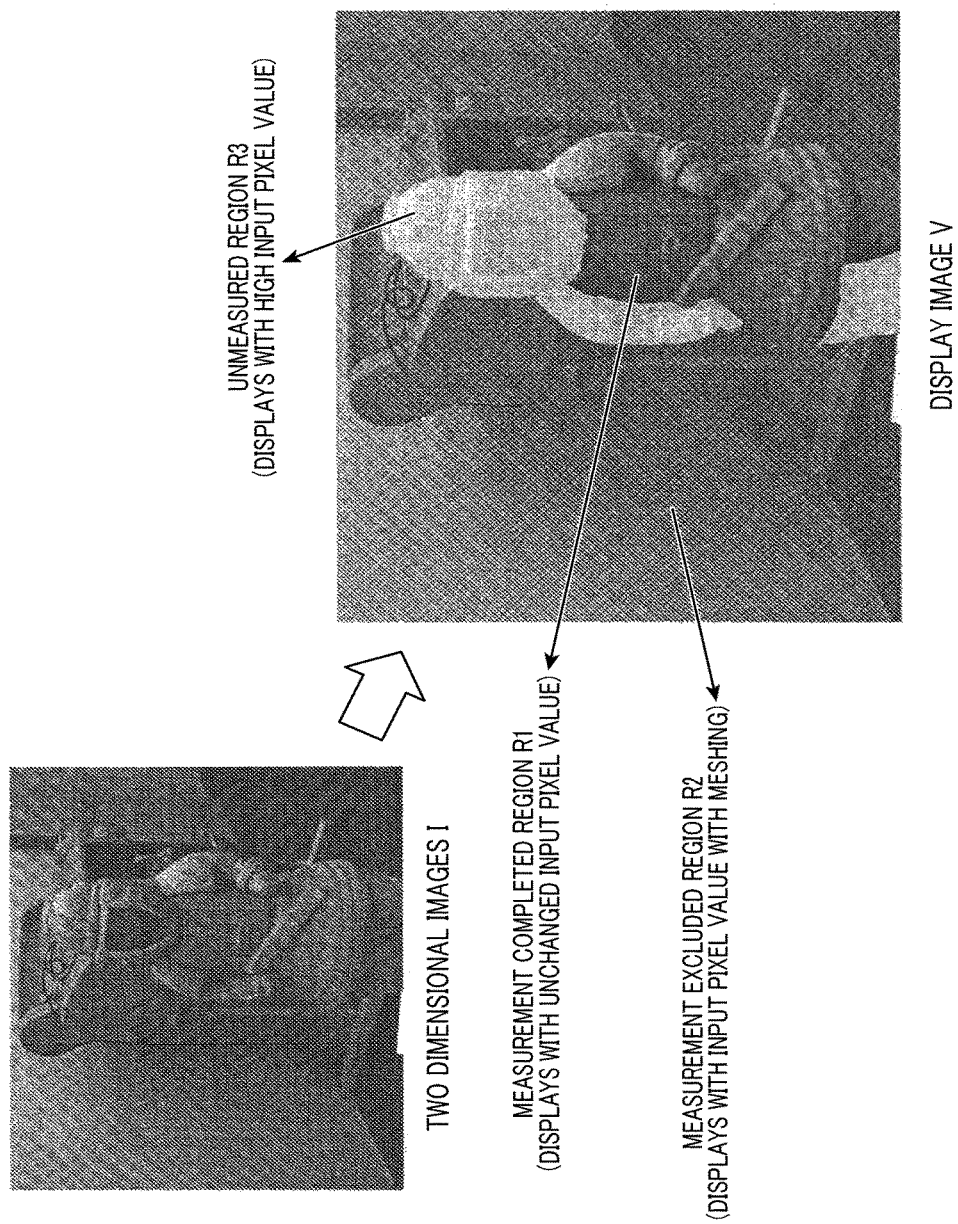

US 10,347,029 B2

APPARATUS FOR MEASURING THREE DIMENSIONAL SHAPE, METHOD FOR MEASURING THREE DIMENSIONAL SHAPE AND THREE DIMENSIONAL SHAPE MEASUREMENT PROGRAM

CROSS-REFERENCE TO RELATED APPLICATIONS

The present application is a continuation of International Application No. PCT/JP2014/074424, filed Sep. 16, 2014, which is based upon and claims the benefits of priority to Japanese Application No. 2013-230321, filed Nov. 6, 2013. The entire contents of these applications are incorporated herein by reference.

BACKGROUND OF THE INVENTION

Field of the Invention

The present invention relates to a three-dimensional shape measurement apparatus, a three-dimensional shape measurement method and a three-dimensional shape measurement program.

Discussion of the Background

Non patent literature 1 describes an example of a technique in which a three dimensional shape model of an object is generated based on a plurality of two dimensional images including the object captured by moving an imaging unit. According to the three dimensional shape measurement system described in NPL 1, a three dimensional shape mode of an object is generated as follows. First, a moving image of a whole object is captured by moving a stereo camera included in the imaging unit. Here, the stereo camera is also referred to as a both-eye stereoscopic vision camera, serving as an apparatus that captures images of the object from a plurality of viewpoints. Subsequently, at every predetermined frame, three-dimensional coordinate values corresponding to respective pixels are calculated based on a pair of two dimensional images. The three-dimensional values calculated at this time are expressed by a plurality of three-dimensional coordinate values which are different from each other depending on each viewpoint of the stereo camera. Accordingly, in the three-dimensional shape measurement system described in NPL1, feature point group included in a plurality of two dimensional images captured as a moving image is tracked over a plurality of frames, whereby movement of the view point of the stereo camera is estimated. Then, three-dimensional shape models expressed with a plurality of coordinate systems, based on the estimation result of the movement of the view point, are integrated to the same coordinate system so that the three-dimensional shape model of the object is generated.

In NPL2, an example of a technique is described in which a three-dimensional model of an object is generated based on a plurality of depth images (also referred to as distance image or the like) acquired while an infrared depth sensor (hereinafter referred to as imaging unit) is moved. The depth image is an image where distance information about the measured object (information about the distance between the imaging unit and the object) is expressed in pixel units. According to a three-dimensional shape measurement system described in NPL 2, the infrared depth sensor is configured of an infrared projection unit, an infrared imaging unit and a signal processing unit. The infrared projection unit projects a random speckle pattern onto the object, and the infrared imaging unit captures reflected light reflected at the object. Then, the signal processing unit calculates the distance information about the object based on a deviation and a change in the shape of the random speckle pattern captured by the infrared imaging unit and generates depth images. The configuration or the like of this infrared depth sensor is described in PTL 1 to PTL 3 for example.

PTL 1: JP-A-2011-527790
PTL 2: JP-A-2009-511897
PTL 3: JP-A-2009-530604
PTL 4: JP-A-2008-328367 (published as JP-A-2010-152535)
NPL 1: Hiroki Unten, Tomohito Masuda, Tohru Mihashi and Makoto Ando, A practical VR-model generation method by utilizing moving-shots with stereo camera: Stereo Moving-shot Modeling System (SM2S)-, The Virtual Reality Society of Japan, Journal Vol. 12, No. 2, 2007
NPL 2: Shahram Izadi, David Kim, Otmar Hilliges, David Molyneaux, Richard Newcombe, Pushmeet Kohli, Jamie Shotton, Steve Hodges, Dustin Freeman, Andrew Davison, and Andrew Fitzgibbon, "KinectFusion: Real-time 3D Reconstruction and Interaction Using a Moving Depth Camera," October 2011, Publisher: ACM Symposium on User Interface Software and Technology, (searched on Apr. 15, 2013), internet address <URL: http://research-.microsoft.com/apps/pubs/default.aspx?id =1554 16>

SUMMARY OF THE INVENTION

According to one aspect of the present invention, a three-dimensional shape measurement apparatus includes an imaging unit that successively outputs two-dimensional images captured, a memory unit that stores the two-dimensional images outputted by the imaging unit, a three-dimensional shape model generation unit which generates a three-dimensional shape model, based on the two-dimensional images and stores the three-dimensional shape model in the memory unit, a region calculation unit that calculates, based on the two-dimensional images and the three-dimensional shape model stored in the memory unit, a measurement-completed region in the two-dimensional images, and a display image generation unit that generates, based on the measurement-completed region, a display image from the two-dimensional images.

According to another aspect of the present invention, a method of measuring a three-dimensional shape includes capturing a plurality of two-dimensional images successively, storing the two-dimensional images into a memory unit, generating a three-dimensional shape model based on the two-dimensional images stored, storing the three-dimensional shape model into the memory unit, calculating a measurement-completed region in the two-dimensional images based on the two-dimensional images and the three-dimensional shape model stored in the memory unit, and generating a display image from the two-dimensional images based on the measurement-completed region calculated.

According to another aspect of the present invention, a non-transitory computer-readable storage medium has a program stored therein, the program causing a computer to execute storing a plurality of two-dimensional images into a memory unit, the two-dimensional images being outputted by an imaging unit that captures the two-dimensional images, generating a three-dimensional shape model based on the two-dimensional images stored, storing the three-dimensional shape model into the memory unit, calculating a measurement-completed region in the two-dimensional images from the two-dimensional images and the three-dimensional shape model stored in the memory unit, and generating a display image from the two-dimensional images based on the measurement-completed region.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a flowchart showing an example of a control procedure performed by the three-dimensional shape measurement apparatus shown in FIGS. 1 and 2.

FIG. 4 is a diagram schematically showing an image processing performed by a display image generation unit shown in FIG. 1.

DESCRIPTION OF THE EMBODIMENTS

Figure 1:
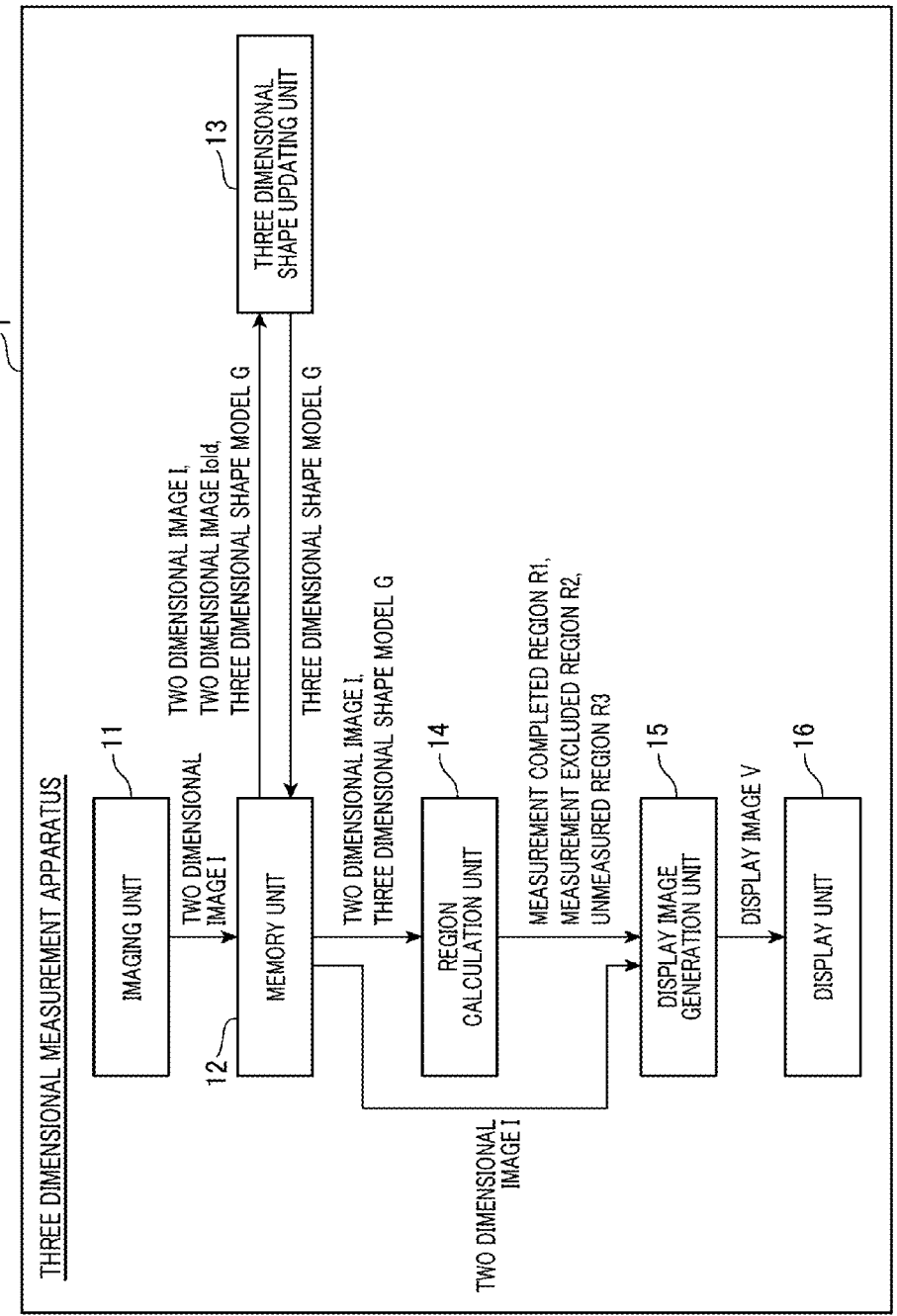
FIG. 1 is a functional block diagram showing an example of a three-dimensional shape measurement apparatus according to an embodiment.

The embodiments will now be described with reference to the accompanying drawings, wherein like reference numerals designate corresponding or identical elements throughout the various drawings.

Hereinafter, with reference to the drawings, a three-dimensional shape measurement apparatus according to the present invention will be described. In the present specification, the three-dimensional shape model of an object is referred to as a model in which a shape of the object defined in a three-dimensional space is expressed with numerical values stored in a computer. For example, the model refers to a point cloud data in which the surface shape of the object is restored using a plurality of points in three-dimensional space, based on a two-dimensional image of the multi view points or a two-dimensional image where each pixel expresses distance information. In the present specification, the three-dimensional shape measurement is defined as a concept including generation of a three-dimensional shape model of an object by capturing a plurality of two-dimensional images, and capture of a plurality of two-dimensional images for generating the three-dimensional shape model of the object.

FIG. 1 is a functional block diagram showing an example of a three-dimensional shape measurement apparatus 1 according to an embodiment. The three-dimensional shape measurement apparatus 1 is provided with an imaging unit 11, a memory unit 12, a three-dimensional shape model generation unit 13 (three-dimensional shape updating unit), a region calculation unit 14, a display image generation unit 15 and a display unit 16.

The imaging unit 11 successively outputs captured predetermined two-dimensional images. According to the present embodiment, each two-dimensional image is defined as an image based on pixel values captured by the imaging element having a plurality of two-dimensionally arranged pixels, or a signal or data representing the image. In this case, the images include a monochrome image (gray scale image), a color image, an infrared image, a distance image or the like, or images simultaneously captured.

The memory unit 12 is a memory apparatus that stores a two-dimensional image outputted by the imaging unit 11 and a measurement-completed three-dimensional shape model.

The three-dimensional shape model generation unit 13 updates the three-dimensional shape model based on a two-dimensional image group stored in the memory unit 12. According to a generation method of the three-dimensional shape model based on the two-dimensional image group, for example, a captured object region included in a plurality of two-dimensional images is estimated as a silhouette (silhouette image). Moreover, a space region can be calculated from a region where a plurality of estimated silhouettes are overlapped (e.g., refer to PTL 4). For this method, a visual volume cross method, or the like can be used. Also, the three-dimensional shape model generation unit 13 further includes an accuracy-setting change-instruction unit indicating a change of an accuracy setting.

The region calculation unit 14 calculates, based on the two-dimensional images and the three-dimensional shape model stored in the memory unit 12, a measurement-completed region in the two-dimensional images, i.e., a region where generation of the three-dimensional shape model has been completed. Also, the region calculation unit 14 calculates, based on the two-dimensional images and the three-dimensional shape model stored in the memory unit 12, a measurement-excluded region, the measurement-completed region and an unmeasured region in the two dimensional images. Further, the region calculation unit 14 calculates, based on the two-dimensional images and the three-dimensional model, a low accuracy measurement-completed region and a high accuracy measurement-completed region in the two-dimensional images.

The display image generation unit 15 generates a display image V, based on a measurement-completed region R1 and a measurement-excluded region R2 calculated by the region calculation unit 14, and a two-dimensional image I stored in the memory unit 12. Also, the display image generation unit 15 may generate the display image V from the two-dimensional images, based on the measurement-completed region R1, the measurement-excluded region R2 and unmeasured region. In this case, the display image V can be generated as an image where pixel values in the measurement-completed region R1 are high and pixel values in the measurement-excluded region R2 are low, among the respective pixels that constitute the two dimensional image I. In more detail, using positive constants a and b, and a pixel value q' (u, v) of a pixel q (u, v) on the display image can be defined with respect to a pixel value p' (u, v) of a pixel p (u, v) on the two dimensional image I as follows.

$$q(u, v) = \begin{cases} p(u, v) + a & \text{if } p(u, v) \in R1 \\ p(u, v) - b & \text{if } p(u, v) \in R2 \\ p(u, v) & \text{else} \end{cases} \quad \text{Math 1}$$

The display unit 16 serves as a display device for a liquid crystal display device or an organic EL device, or the like displaying a display image which is generated by the display image generation unit 15.

The three-dimensional shape measurement apparatus 1 may further include an optimum moving direction calculation unit which calculates an optimum moving direction of the imaging unit based on a distribution of the unmeasured region in the two-dimensional images, and an optimum moving direction output unit which outputs information guiding a moving direction calculated by the optimum moving direction calculation unit.

Next, with reference to FIG. 2, a configuration example will be explained for the region calculation unit 14 which has been explained with reference to FIG. 1.

Figure 2:
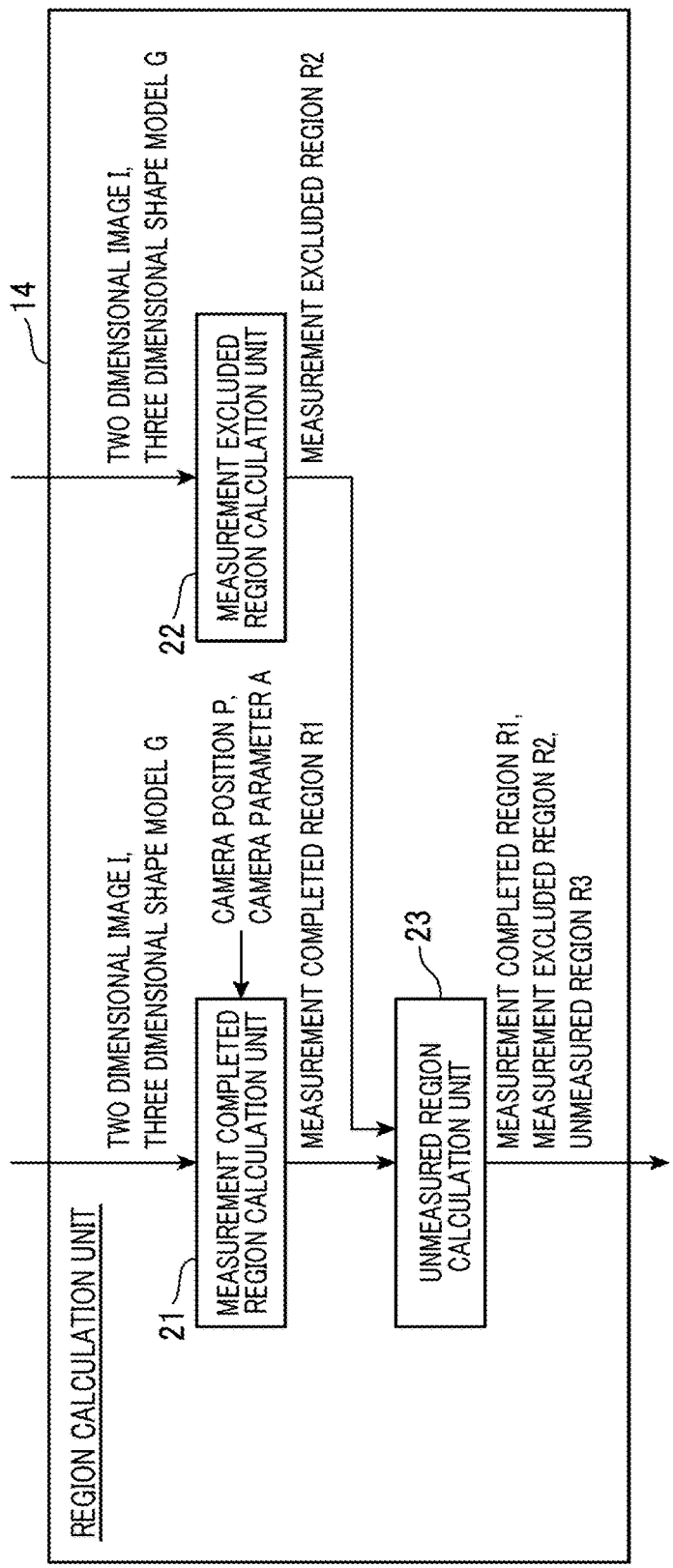
FIG. 2 is a functional block diagram showing an example of a region calculation unit shown in FIG. 1.

FIG. 2 is a functional block diagram showing an example of the region calculation unit as shown in FIG. 1. The region calculation unit 14 as shown in FIG. 2 includes a measurement-completed region calculation unit 21, a measurement-excluded region calculation unit 22, and an unmeasured region calculation unit 23. The measurement-completed region calculation unit 21 calculates, based on the two-dimensional image group and the three-dimensional shape model stored in the memory unit 12, the measurement-completed region R1 in the two-dimensional images including an object to be captured, where the three-dimensional shape model has already been produced. The measurement-excluded region calculation unit 22 calculates, based on the two-dimensional image group and the three-dimensional shape model stored in the memory unit 12, a measurement-excluded region R2 in the two-dimensional images including an object to be captured, where three-dimensional shape model is not produced. The unmeasured region calculation unit 23 calculates, based on the calculated measurement-completed region R1 and the calculated measurement-excluded region R2, an unmeasured region R3 in the two-dimensional images including a captured object.

The measurement-completed region calculation unit 21 can calculate the measurement-completed region R1 by using an estimation result of movement of the three-dimensional shape measurement apparatus 1 stored in the memory unit 12. In this case, in the case where the three-dimensional shape model G stored in the memory unit 12 is expressed as two-dimensional images from a viewpoint of when capturing the two-dimensional images I including the captured object, a group of pixels which have been successfully calculated corresponds to the measurement-completed region R1. Thus, the measurement-completed region R1 can be calculated. In other words, for example, in the case where the above-described three-dimensional model G is expressed as a group of three-dimensional points Ai (xi, yi, zi) expressed based on the absolute coordinate (i=1, 2, . . . , n, where n is sum of the three-dimensional points that constitute the three-dimensional shape model G), a coordinate transformation T transformed from the absolute coordinate to the viewpoints when the two-dimensional images I are captured, and a projection matrix P when capturing the two-dimensional images I are used with respect to the pixel p (u, v) on the two-dimensional images I. Then, the measurement-completed region R1 can be defined as follows.

$$R1=\{p(u, v)|(u, v)=\text{int}(PTAi), 3i(i=1, 2, \ldots, n)\} \quad \text{Math 2}$$

where int ((s, t)) is a function that returns an integer vector in which respective elements of real vector (s, t) are rounded off.

The measurement-excluded region calculation unit 22 can calculate the measurement-excluded region R2 by using a depth value of the three-dimensional shape model stored in the memory unit 12. In this case, a portion having a depth value larger than or equal to or smaller than or equal to a predetermined value of the three-dimensional shape model G stored in the memory unit 12 is regarded as a close-range view or a distant view which is excluded from measurement. A group of pixels of the two-dimensional images I including the captured object corresponding to these views excluded from a measurement corresponds to the measurement-excluded region R2. Thus, the measurement-excluded region R2 can be calculated. In other words, a depth value d (u, v), and depth threshold dmin and dmax are used with respect to the pixel p (u, v) on the two-dimensional images I including the captured object, whereby the measurement-excluded region R2 can be defined as follows.

$$R2=\{p (u, v)|d(u, v) \leq d\text{min AND } d(u, v) \geq d\text{max}\} \quad \text{Math 3}$$

The unmeasured region calculation unit 23 can calculate an unmeasured region R3 by using the measurement-completed region R1 and the measurement-excluded region R2. In this case, for example, the unmeasured region R3 does not belong to either the measurement-completed region R1 or the measurement-excluded region R2, among the pixels of the two-dimensional images I including the captured object. However, the unmeasured region R3 corresponds to a group of pixels. Thus, the unmeasured region R3 can be calculated. In other words, the unmeasured region R3 can be defined as follows with respect to the pixel p (u, v) on the two-dimensional images I including the captured object.

$$R3=\{p(u, v)|\text{NOT } p(u, v) \in R1 \text{ OR } p(u, v) \in R2\} \quad \text{Math 3}$$

Next, with reference to FIGS. 3 and 4, an operation example will be described for the three-dimensional shape measurement apparatus 1 as shown in FIGS. 1 and 2. For example, when a person in charge of measurement performs a predetermined operation, the imaging unit 11 acquires two-dimensional images I (step S301). Subsequently, the memory unit 12 stores the two-dimensional images I (step S302). Next, the three-dimensional shape model generation unit 13 updates a stored three-dimensional shape model G, based on the two-dimensional images I and stored two-dimensional images Iold (step S303). Then, the measurement-completed region calculation unit 21 calculates the measurement-completed region R1 based on stored two-dimensional images I, a stored three-dimensional shape model G, a camera position P and a camera parameter A (step S304). Next, the measurement-excluded region calculation unit 22 calculates the measurement-excluded region R2 based on the stored two-dimensional images I and the stored three-dimensional shape model G (step S305). Subsequently, the unmeasured region calculation unit 23 calculates the unmeasured region R3 based on the measurement-completed region R1 and the measurement-excluded region R2 (step S306). Next, the display image generation unit 15 generates a display image V based on the measurement-completed region R1, the measurement-excluded region R2, the unmeasured region R3 and the two-dimensional images I (step S307). Then, the display unit 16 displays the display image V (step S308). Subsequently, when the three-dimensional shape measurement process is required to be ended based on a command or the like from the person in charge of measurement, the process is terminated (YES at step S309). Otherwise (No at step S309), the process returns to step S301.

Here, the person in charge of measurement moves the imaging unit 11 (imaging unit) based on the display image V which is displayed by the display unit 16. At the same time, the imaging unit 11 acquires two-dimensional images I including an object captured with a viewpoint different from previous one. At this time, the process returns to step S301 and the above-described processing steps are repeatedly executed.

Thus, in the three-dimensional shape measurement apparatus 1 of the present embodiment, the display image V is generated based on the measurement-completed region R1 calculated from the two-dimensional images I including the captured object and the three-dimensional shape model G. In other words, in this configuration, when the display image V is generated, information representing whether or not respective pixels in the images belong to the measurement-completed region R1 can be used as a reference. According to this configuration, for example, a display image can be displayed on the display unit 16, where emphasized measurement-completed region R1 is generated. In other words, compared to the case where the three-dimensional shape model G is displayed on the display unit 16 in addition to the two-dimensional images I including merely a captured object, a person in charge of measurement can readily determine how to concretely move the imaging unit 11 so as to measure the unmeasured region.

The region calculation unit 14 of the present embodiment calculates the measurement-completed region R1, the measurement-excluded region R2 and the unmeasured region R3, based on the two-dimensional images Told stored in the memory unit 12 and the three-dimensional shape mode G, and outputs the calculated regions R1 to R3 to the display image generation unit 15. Therefore, when generating the display image V, the measurement-completed region R1, the measurement-excluded region R2 and the unmeasured region R3 can be used as reference information, whereby it is more clarified how to concretely move the imaging unit 11 so as to measure the unmeasured region for generation of the display image V.

It should be noted that the three-dimensional shape measurement apparatus 1 may include, as shown in FIG. 1, the imaging unit 11, the memory unit 12, the three-dimensional shape model generation unit 13, the region calculation unit 14, the display image generation unit 15 and the display unit 16 which are integrated. Also, for example, each of one or more elements (elements of three-dimensional shape measurement apparatus) can be configured of other apparatuses. For example, the imaging unit 11, the memory unit 12, the three-dimensional shape model generation unit 13, the region calculation unit 14, the display image generation unit 15 and the display unit 16 can be integrated to electronic equipment such as a portable camera and a portable information terminal. Further, for example, part or all of the imaging unit 11, the memory unit 12 and the display unit 16 can be configured of a portable camera and the three-dimensional shape model generation unit 13, the region calculation unit 14, the display image generation unit 15 can be configured of a personal computer.

Furthermore, the three-dimensional shape measurement apparatus 1 may include wireless or wired communication apparatus and connect between the elements shown in FIG. 1 via a wireless or wired communication line.

The three-dimensional shape measurement apparatus 1 can be provided with means (apparatus) for estimating a movement of the three-dimensional measurement apparatus 1, based on the two-dimensional image group and the three-dimensional shape model which are stored in the memory unit 12. The estimation of the movement can be performed, for example, by tracing locations of a plurality of feature points included in each of a plurality of two-dimensional images (for example, refer to NPL 1). In this case, several methods such as a Kande-Lucas-Tomasi method (KLT method) are widely used for tracing the feature points among the plurality of two-dimensional images, e.g., moving images. The estimation result of the movement can be stored in the memory unit 12 for example.

The three-dimensional shape measurement apparatus 1 may include a function that acquires positional information of the own apparatus by using GPS (global positioning system) receiver or the like, or a function that detects a movement of the own apparatus by using an acceleration sensor, a gyro sensor or the like. The detection result of the movement can be stored in the memory unit 12, for example.

The embodiment of the present invention is not limited to the above-described embodiments. For example, the three-dimensional shape measurement apparatus 1 can be configured of one or more CPUs and a program executed in the CPU, and the program can be distributed, for example, via a computer readable recording medium or a communication line.

As described above, according to the three-dimensional shape measurement system described in NPL1 and NPL2, a plurality of two-dimensional images are captured while the imaging unit is moved and a three dimensional shape model (hereinafter referred to as measurement-completed three-dimensional shape model) of the object is generated based on the plurality of captured two-dimensional images. The measurement-completed three-dimensional shape model can be displayed in the display unit almost simultaneously with the image capture.

Meanwhile, in an imaging device such as cameras on the market in which an imaging unit and a display unit are integrated, two-dimensional images captured by the imaging unit can be displayed almost simultaneously with image capture. Hence, the three-dimensional shape measurement system described in NPL 1 and NPL 2 can be simply combined with an imaging device that integrates an imaging unit and a display unit, whereby a measurement-completed three-dimensional shape model in addition to a two dimensional image including a captured object can be displayed almost simultaneously with the image capturing.

However, in this configuration, in the case where unmeasured portions are found based on a display in the display unit, there has been a problem that a person in charge of measurement cannot easily determine how the imaging unit should be specifically moved to measure an unmeasured region.

The present invention is achieved in light of the above-described circumstances and can provide an apparatus for measuring a three-dimensional shape, a method for measuring three-dimensional shape and a three-dimensional shape measurement program, which are capable of readily determining an unmeasured region when measuring a three-dimensional shape.

To solve the above-described problem, a three-dimensional shape measurement apparatus according to a first aspect of the present invention is provided with an imaging unit that successively outputs captured predetermined two-dimensional images; a memory unit that stores the two-dimensional images outputted by the imaging unit; a three-dimensional shape model generation unit that generates three-dimensional shape model based on the predetermined two-dimensional images and stores the generated three-dimensional shape model in the memory unit; a region calculation unit that calculates, based on the two-dimensional images and the three-dimensional shape model stored in the memory unit, a measurement-completed region in the two-dimensional images; and a display image generation unit that generates, based on the measurement-completed region, a display image from the two-dimensional images.

In the three-dimensional shape measurement apparatus according to the first aspect of the present invention, it is preferable that the region calculation unit calculates, based on the two-dimensional images and the three-dimensional shape model stored in the memory unit, a measurement-excluded region, a measurement-completed region and an unmeasured region in the two-dimensional images; and the display image generation unit generates, based on the measurement-excluded region, the measurement-completed region and the unmeasured region, a display image from the two-dimensional images.

In the three-dimensional shape measurement apparatus according to the first aspect of the present invention, it is preferable that the region calculation unit calculates, based on the two-dimensional images and the three-dimensional model stored in the memory unit, a low accuracy measurement-completed region and a high accuracy measurement-completed region in the two-dimensional images.

In the three-dimensional shape measurement apparatus according to the first aspect of the present invention, it is preferable that the three-dimensional shape model generation unit further includes an accuracy-setting change-instruction unit indicating a change of an accuracy setting.

In the three-dimensional shape measurement apparatus according to the first aspect of the present invention, it is preferable that the display image generation unit generates the display image in which pixel values of the measurement-completed region are high and pixel values of the measurement-excluded region are low.

It is preferable that the three-dimensional shape measurement apparatus according to the first aspect of the present invention further includes an optimum moving direction calculation unit which calculates an optimum moving direction of the imaging unit based on a distribution of the unmeasured region in the two-dimensional images; and an optimum moving direction output unit which outputs information guiding a moving direction calculated by the optimum moving direction calculation unit.

Moreover, a three-dimensional shape measurement method according to a second aspect of the present invention includes steps of: subsequently acquiring two-dimensional images (captured image acquiring step); storing the acquired two-dimensional images acquired by the captured image acquiring step into a memory unit (storing step); generating a three-dimensional model based on the two-dimensional images stored by the storing step (three-dimensional shape model generation step); storing the generated three-dimensional model into the memory unit (three-dimensional shape model generation step); calculating a measurement-completed region in the two-dimensional images based on the two-dimensional images and the three-dimensional shape model stored in the memory unit (region calculation step); and generating a display image from the two-dimensional images based on the measurement-completed region calculated in the region calculation step of the measurement-completed region (display image generation step).

Further, a three-dimensional shape measurement program according to a third aspect of the present invention is executed by a computer, including steps of: a storing step of storing the two-dimensional images into a memory unit, the two-dimensional images being outputted by an imaging unit that captures two-dimensional images; a three-dimensional shape model generation step of generating a three-dimensional model based on the two-dimensional images stored in the storing step and storing the generated three-dimensional model into the memory unit; a region calculation step of calculating a measurement-completed region in the two-dimensional images from the two-dimensional images and the three-dimensional shape model stored in the memory unit; and a display image generation step of generating a display image from the two-dimensional images based on the measurement-completed region.

According to aspects of the present invention, it is achieved that an apparatus for measuring three-dimensional shape, a method for measuring a three-dimensional shape and a three-dimensional shape measurement program, which are capable of readily determining an unmeasured region when measuring a three-dimensional shape.

The three-dimensional shape measurement apparatus according to aspects of the present invention, the three-dimensional shape measurement method and the three-dimensional shape measurement program can be used for an imaging device such as digital camera or the like, portable information terminals provided with a camera or the like.

1: three-dimensional shape measurement apparatus
11: imaging unit
12: memory unit
13: three-dimensional shape model generation unit
14: region calculation unit
15: display image generation unit
16: display unit
21: measurement-completed region calculation unit
22: measurement-excluded region calculation unit
23: unmeasured region calculation unit Obviously, numerous modifications and variations of the present invention are possible in light of the above teachings. It is therefore to be understood that within the scope of the appended claims, the invention may be practiced otherwise than as specifically described herein.

What is claimed is:

1. A three-dimensional shape n measurement confirmation apparatus, comprising:
    circuitry configured to
        control an imaging sensor to successively output a plurality of two-dimensional images captured,
        control storage in a memory of the output two-dimensional images,
        generate a three-dimensional shape model based on the two-dimensional images and store the three-dimensional shape model in the memory,
        calculate, based on the two-dimensional images and the three-dimensional shape model stored in the memory, a measurement-completed region in the two-dimensional images, the measurement-completed region being calculated by applying a function to a projection matrix and a coordinate transformation that returns an integer vector in which respective elements of a real vector are rounded off,
        calculate, based on the two-dimensional images and the three-dimensional shape model stored in the memory, a measurement-excluded region and an unmeasured region, the measurement-excluded region being calculated using a depth value of the three-dimensional shape model, and
        generate, based on the measurement-excluded region, the measurement-completed region, and the unmeasured region, a display image from the two-dimensional images that highlights a region of an item in the two-dimensional images that has been measured three-dimensionally.

2. The three-dimensional shape measurement confirmation apparatus according to claim 1, wherein the circuitry is further configured to calculate, based on the two-dimensional images and the three-dimensional shape model stored in the memory, a first measurement-completed region and a second measurement-completed region in the two-dimensional images, and
    wherein the first and second measurement-completed regions differ in measurement accuracy.

3. The three-dimensional shape measurement confirmation apparatus according to claim 2, wherein the circuitry is further configured to instruct a change of an accuracy setting.

4. The three-dimensional shape measurement confirmation apparatus according to claim 1, wherein the circuitry is further configured to calculate, based on the two-dimensional images and the three-dimensional shape model stored in the memory, a first measurement-completed region and a second measurement-completed region in the two-dimensional images, and
wherein the first and second measurement-completed regions differ in measurement accuracy.

5. The three-dimensional shape measurement confirmation apparatus according to claim 4, wherein the circuitry is further configured to instruct a change of an accuracy setting.

6. The three-dimensional shape measurement confirmation apparatus according to claim 1, wherein the circuitry is further configured to generate the display image in which a pixel value of the measurement-completed region is higher than a pixel value of the measurement-excluded region.

7. The three-dimensional shape measurement confirmation apparatus according to claim 1, wherein the circuitry is further configured to:
calculate an optimum moving direction of the imaging sensor, based on a distribution of an unmeasured region in the two-dimensional images, and
output information guiding a calculated moving direction.

8. The three-dimensional shape measurement confirmation apparatus according to claim 1, wherein the generated display image further indicates an excluded region which is designated as external to the item.

9. The three-dimensional shape measurement confirmation apparatus according to claim 1, wherein the generated display image further highlights a second region of the item in the two-dimensional images that has not been measured three-dimensionally.

10. A method of confirming a measurement of a three-dimensional shape, comprising:
capturing a plurality of two-dimensional images successively using an imaging sensor;
storing the two-dimensional images into a memory;
generating a three-dimensional shape model based on the two-dimensional images stored:
storing the three-dimensional shape model into the memory;
calculating a measurement-completed region in the two-dimensional images based on the two-dimensional images and the three-dimensional shape model stored in the memory, the measurement-completed region being calculated by applying a function to a projection matrix and a coordinate transformation that returns an integer vector in which respective elements of a real vector are rounded off;
calculating based on the two-dimensional images and the three-dimensional shape model stored in the memory, a measurement- excluded region and an unmeasured region, the measurement-excluded region being calculated using a depth value of the three-dimensional shape model, and
generating a display image from the two-dimensional images, based on the measurement-excluded region, the measurement-completed region and the unmeasured region, that highlights a region of an item in the two-dimensional images that has been measured three-dimensionally.

11. The method according to claim 10, wherein the calculating includes calculating, based on the two-dimensional images and the three-dimensional shape model stored in the memory, a first measurement-completed region and a second measurement-completed region in the two-dimensional images, and the first and second measurement-completed regions differ in measurement accuracy.

12. The method according to claim 11, wherein the generating includes instructing a change of an accuracy setting.

13. The method according to claim 10, wherein the generating includes generating the display image in which a pixel value of the measurement-completed region is higher than a pixel value of the measurement-excluded region.

14. The method according to claim 10, further comprising:
calculating an optimum moving direction of the imaging sensor, based on a distribution of an unmeasured region in the two-dimensional images; and
outputting information guiding a calculated moving direction.

15. The method according to claim 10, wherein the generated display image further indicates an excluded region which is designated as external to the item.

16. The method according to claim 10, wherein the generated display image further highlights a second region of the item in the two-dimensional images that has not been measured three-dimensionally.

17. A non-transitory computer-readable storage medium having a program stored therein, the program causing a computer to execute:
storing a plurality of two-dimensional images into a memory, the two-dimensional images being outputted by an imaging sensor that captures the two-dimensional images;
generating a three-dimensional shape model based on the two-dimensional images stored;
storing the three-dimensional shape model into the memory;
calculating a measurement-completed region in the two-dimensional images from the two-dimensional images and the three-dimensional shape model stored in the memory, the measurement-completed region being calculated by applying a function to a projection matrix and a coordinate transformation that returns an integer vector in which respective elements of a real vector are rounded off;
calculating based on the two-dimensional images and the three-dimensional shape model stored in the memory, a measure lent-excluded region and an unmeasured region, the measurement-excluded region being calculated using a depth value of the three-dimensional shape model; and
generating a display image from the two-dimensional images, based on the measurement-excluded region, the measurement-completed region, and the unmeasured region, that highlights a region of an item in the two-dimensional images that has been measured three-dimensionally.

* * * * *